US006740835B2

(12) United States Patent
Steinmetz et al.

(10) Patent No.: US 6,740,835 B2
(45) Date of Patent: May 25, 2004

(54) METHOD OF OUTSORTING RETURN TO SENDER MAIL USING AN INCOMING MAIL SORTING APPARATUS

(75) Inventors: John H Steinmetz, Bridgeport, CT (US); Robert K. Gottlieb, Milford, CT (US); Joseph D Mallozzi, Trumbull, CT (US); Edward P. Daniels, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 249 days.

(21) Appl. No.: 09/996,092

(22) Filed: Nov. 28, 2001

(65) Prior Publication Data

US 2003/0116482 A1 Jun. 26, 2003

(51) Int. Cl.$^7$ .............................. B07C 5/00; G06K 9/00

(52) U.S. Cl. ....................... 209/584; 209/583; 209/900; 700/223; 700/224; 700/225; 700/226

(58) Field of Search ................................ 209/584, 583, 209/900; 700/223–226

(56) References Cited

U.S. PATENT DOCUMENTS

| | | | | |
|---|---|---|---|---|
| 4,632,252 A | | 12/1986 | Haruki et al. | 209/546 |
| 4,992,649 A | | 2/1991 | Mampe et al. | 235/462 |
| 5,538,138 A | | 7/1996 | Reich | 209/3.3 |
| 5,697,504 A | | 12/1997 | Hiramatsu et al. | 209/546 |
| 5,734,568 A | | 3/1998 | Borgendale et al. | 364/409 |
| 6,327,373 B1 | * | 12/2001 | Yura | 382/101 |
| 6,610,955 B2 | * | 8/2003 | Lopez | 209/584 |

OTHER PUBLICATIONS

US2002/0029202 A1 Pre Grant Publication, Lopez.*

* cited by examiner

*Primary Examiner*—Donald P. Walsh
*Assistant Examiner*—Jonathan R Miller
(74) *Attorney, Agent, or Firm*—Christopher J. Capelli; Angelo N. Chaclas

(57) ABSTRACT

The an embodiment of the present invention generally comprises a mailpiece sorting apparatus including an addressee database and a state/ZIP Code list generated from the addressee database. Mailpieces for which the addressee cannot be determined are processed using ZIP Code and/or State information read from the mailpiece. The state/ZIP Code information read from the mailpiece is compared to the state/ZIP Code list to determine if there is a match. If there is not match, the mailpiece is sorted to a "return to sender" bin.

9 Claims, 8 Drawing Sheets

METHOD OF OUTSORTING RETURN TO SENDER MAIL USING AN INCOMING MAIL SORTING APPARATUS

FIELD OF THE INVENTION

The invention disclosed herein relates generally to automated mail sorting and more particularly, a method of processing return to sender mailpieces using an automated mail sorting apparatus.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition (OCR) system and compare the read information to an addressee database in order to determine the appropriate destination points for delivery of the mailpieces. Some of the incoming mail received at a mailroom of the company can be unreadable by the OCR system, the quantity of which can be great since recipients cannot control the addressee format in which the incoming mail is received. Some of the unreadable mail could be, for example, mail which is not OCR readable "OCR rejects" (i.e. smeared or needs to be opened to determine addressee), "mystery mail" which mail with no particular addressee (i.e. mail addressed to a company or department only or mail with poor quality handwriting), or "research mail" (i.e. mail that can not be read by OCR but does not require opening for the operator to determine the addressee, including the situation where there are several potential addressees with the same name). The unreadable mail, which will be referred to generally as "reject mail" is expensive to process since it drains the resources of the mail room requiring additional time and labor for sorting and delivery.

Another type of mail which can be categorized as unreadable generally by incoming mail sorting apparatus is "return to sender" (RTS) since the addressee, in most cases, is not in the addressee database of the mail sorting apparatus. These mailpieces, absent additional processing, are typically delivered to the "OCR reject" bin and are handled manually which is labor intensive and expensive.

Typical "return to sender" mail is marked with "return to sender" text and/or a graphics symbol. The graphics symbols applied to "return to sender" mail are not uniform or standard and are not applied to a standard location on "return to sender" mailpieces. For these reasons, there are challenges to recognizing the "return to sender" symbol on a mailpiece by using an OCR system. Thus, a typical OCR system configured to recognized text would need additional capabilities and additional "read regions" to recognize "return to sender" icon or markings. This additional capability can be expensive and difficult to implement because of the lack of standardization.

Previously, if a determination could not be made by the incoming mail handling machine as to the addressee, a video image of the mailpiece was viewed by an operator and in the case where the addressee image was readable by the operator, addressee information was keyed into the system and associated with an identification number for the mailpiece. This is typically done after the unreadable mailpieces are sorted into a reject bin because it requires time to make the determination and provide the information to the system for proper sorting. The previously rejected mailpieces are then resorted by reading the identification information which can be printed on the mail during the first sort. The identification information is linked with the addressee information manually keyed in by the operator during the reject processing/video coding sequence and is used to sort the mailpiece to the proper destination bin.

Video processing of mailpieces has been performed at on-site video coding terminals or off-site video coding facilities where the video image is transmitted for determination of addressee by an operator. The information is then transferred back to the sorting apparatus. The software and hardware costs associated with video processing can be high because video coding requires additional computer systems, image servers and workstations. Additionally, licensing fees for video coding software can be expensive. Video coding can also be labor intensive because the operator has to input information using a keyboard. While predictive keying can be used, the operator is still bogged down with using his or her hands to input addressee information. With video coding, a separate video coding operator is needed in apart from the incoming mailpiece sorting apparatus operator in order to keep throughput on the sorting apparatus while processing rejects.

It would be helpful if the mailpieces for which an intended recipient has not been identified could be processed additionally, quickly and in an automated fashion so as to encumber fewer additional resources. One of the problems of the prior art is that a system is not available for providing additional automated identification of addressees or destinations. Another problem of the prior art is that a system is not available which provides higher throughput and decreased labor costs. Another problem of the prior art is that is can be expensive. Yet another problem of the prior art is that incoming mail handling machines do not include additional functionality for automatically determining the intended recipient when the mailpiece is a "returned to sender" mailpiece. Therefore, a method of processing "return to sender" mailpieces is needed which integrates "return to sender" processing with the incoming mailpiece sorting apparatus with increased read rates and with greater throughput.

SUMMARY OF THE INVENTION

This invention overcomes the disadvantages of the prior art by providing a method of processing reject mailpieces and "return to sender" mailpieces with better throughput and lower labor costs. This in turn affords quicker mailpiece processing. The present invention is directed, in general to automated incoming mailpiece sorting apparatus and more particularly, a method of processing "return to sender" mailpieces using an automated incoming mailpiece sorting apparatus with an addressee database and state/ZIP Code list to identify "return to sender" mailpieces.

The mailpiece sorting apparatus may generally comprise a feeder, a scanner, a mailpiece deliverer, compartments or bins for receiving sorted mailpieces, optical character recognition system (OCR) for reading addressee information, a personal computer (PC) or microprocessor based system, recipient matching software and an addressee database. The mailpiece sorting apparatus of the present invention also comprises software that identifies addressee information and assigns a confidence level to such identification. The "level of confidence" assists to provide a greater percentage of mailpieces correctly identified as "return to sender" mailpieces and deliver such mailpieces to a "return to sender" bin.

The basic principle for outsorting "return to sender" mail is that if an incoming mailpiece arrives from a post, such as the USPS, with a ZIP Code or state that is not contained in a predefined state/ZIP Code list created from the addressee database, then the mailpiece is considered to be "return to sender" mail. The state/ZIP Code list is created from the states and ZIP Code entries in the addressee database of the automated incoming mailpiece sorting apparatus. It is assumed that normal incoming post office mail will be addressed to cities, states, and ZIP Codes in the Recipient table and that "return to sender" mail will not. The method will not outsort "return to sender" mail whose original ZIP Code (or in some cases state) is in the state/ZIP Code list. Such mailpieces will be sent to the OCR reject bin.

This method of the present invention does not outsort "return to sender" mailpieces whose original city, state, ZIP Code address line has been completely obscured by "return to sender" graphics, labels, or strikeouts applied by the post office (see below). Such mailpieces are sent to the OCR reject bin. However, if either the state or ZIP Code of the original address is readable and assigned a high "level of confidence", the mailpiece can be outsorted as a "return to sender" mailpiece.

In an embodiment of the present invention, mailpieces are sorted by the mailpiece sorting apparatus during a first-pass sort (i.e. on first pass mailpieces are divided into available bins, on next pass, mailpieces from one bin of the first pass are resorted into available bins). Mailpieces that can be read and addressees identified using the OCR system or the post OCR processing application are sent to their designated sort bins. Mailpieces that the mailpiece sorting apparatus OCR system cannot determine the recipient for are ("rejects") and/or "return to sender" (RTS) mailpieces. These mailpieces, as the case may be, are sent to a reject bin or a "return to sender" bin. Once the first pass sorting is completed, the rejects may be processed using a reject sorting mode such as video coding, manual identification or voice recognition system or other system determined by one of ordinary skill in the art using factors such as cost and throughput.

An advantage of the method of the present invention is that it provides higher throughput with minimal additional hardware, software and labor costs. Another advantage of the present invention is that it allows for additional automated processing. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
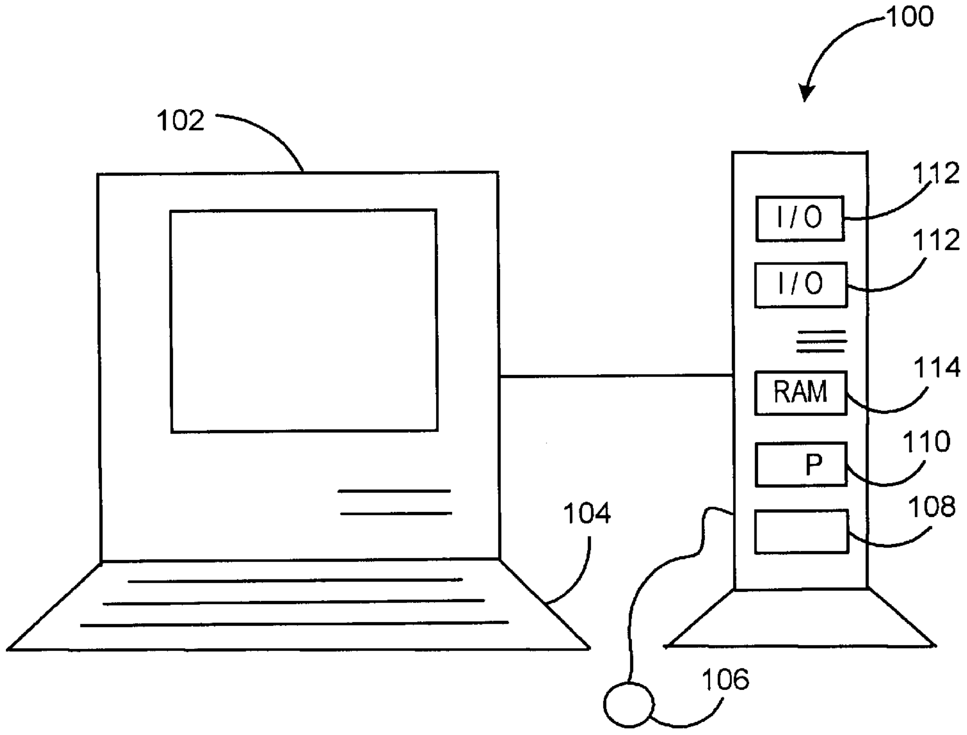
FIG. 1 is a block diagram that illustrates a computer system upon which an embodiment of the invention may be implemented.

In describing the present invention, reference will be made herein to FIGS. 1–6 of the drawings in which like numerals refer to like features of the invention. Features of the invention are not necessarily shown to scale in the drawings.

Hardware Overview

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer also includes a conventional processor 110, such as a Pentium® microprocessor manufactured by Intel, and conventional memory devices such as hard drive 108, floppy drive or CD drive 112, and memory 114.

Figure 2A:
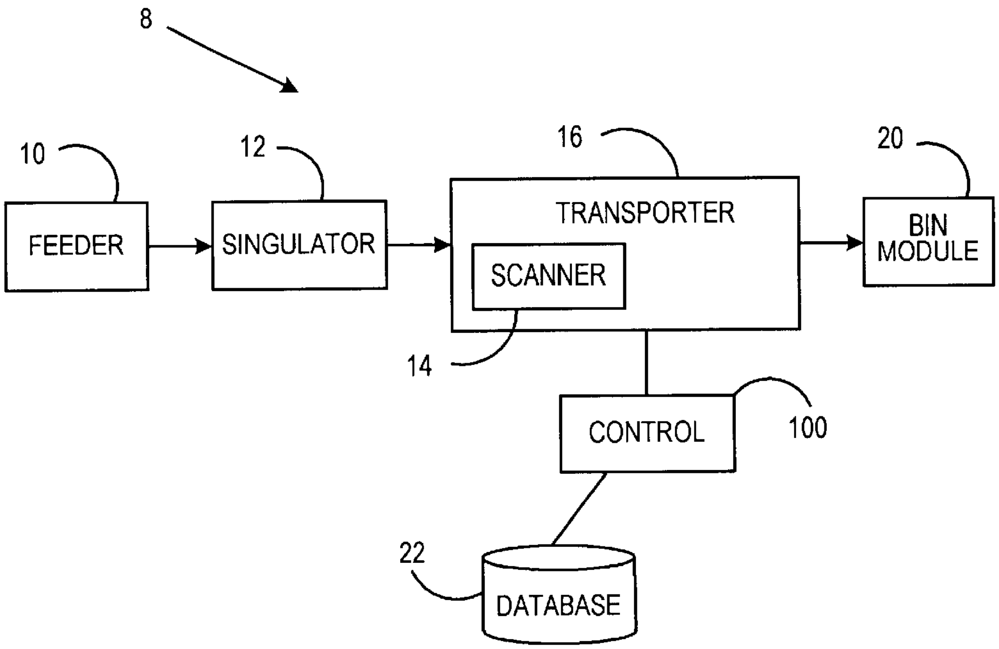
FIG. 2*a* illustrates the connection of the computer system to the sorting apparatus.
Figure 2B:
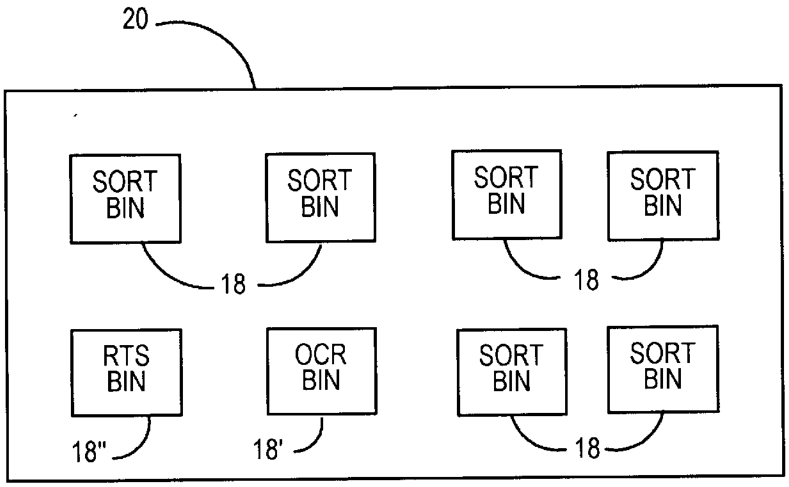
FIG. 2*b* is a block diagram illustrating a eight bin module which may be part of the mailpiece sorting apparatus used to perform an embodiment of the method of the present invention.

The computer system 100 can be connected to a sorting apparatus 8 as illustrated in FIG. 2*a*. The mailpiece sorting apparatus 8 may generally comprise a feeder 10, a line scan camera 14 (and OCR software, not shown), a mailpiece transporter 16, a bin module 20 (shown in FIG. 2*b*) with compartments or bins 18, 18', 18'' for receiving sorted mailpieces 30 and a control system 100 which may be the microprocessor based personal computer system 100 described above. The computer system 100 includes appropriate memory devices 108, 114 for storage of information such as an address database 22. One of ordinary skill in the art would be familiar with the general components of the sorting apparatus upon which the method of the present invention may be performed.

The mailpiece sorting apparatus 8 and the OCR software may be used to determine the addressee of the mailpiece 30 or other information on the face of the mailpiece 30. The reading of various information may be performed with the assistance of intelligent character recognition (ICR) or imaging and optical character recognition (OCR/IC) which may be part of the above mentioned OCR software and can read the various fields on the mailpiece 30.

Reject Mailpieces

Figure 3A:
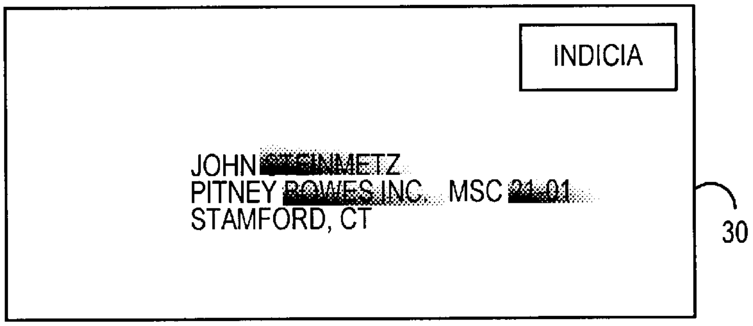
FIGS. 3*a*–3*b* illustrate various reject mailpieces.
Figure 3B:
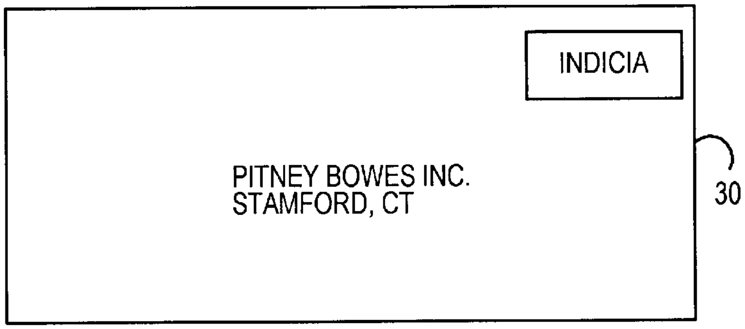

FIG. 3*a* is an example of a reject mailpiece 30 which is unreadable by the OCR system because the addressee information is smeared ("OCR reject"). In some instances, the addressee information can be smeared to the point where the operator would need to open the mailpiece 30 to determine the addressee. FIG. 3*b* is an example of a reject mailpiece 30 for which the intended individual addressee cannot be determined from the face of the mailpiece 30 because there is no individual addressee but rather a general address to the company, as in this example, Pitney Bowes Inc. ("mystery mail"). In the case of the mystery mail of FIG. 3*b*, the mailpiece 30 would need to be opened to determine the appropriate addressee. In another example, not shown, the mailpiece 30 could be addressed to a company and/or department and would need to be opened to determine the appropriate addressee.

Figure 3C:
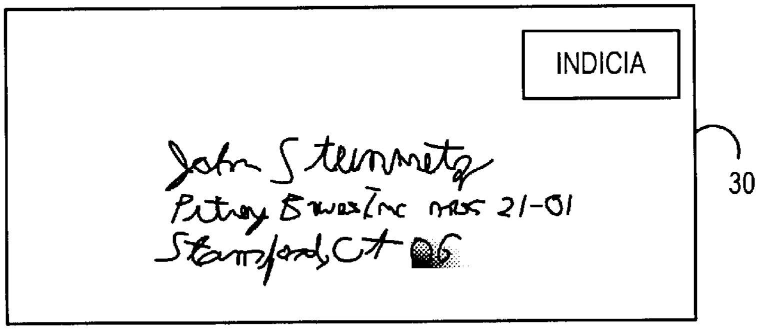

FIG. 3*c* is an example of mystery mail for which the intended individual addressee cannot be determined using OCR because the handwriting in the addressee segment is unreadable by the OCR ("mystery mail"). It should be noted that while some handwriting is readable by OCR systems, not all handwriting is automatically readable, especially handwriting where the character shapes are of poor quality and are poorly spaced such as, for example, some cursive writing as is illustrated on mailpiece 30 in FIG. 3*c*.

Figure 3D:
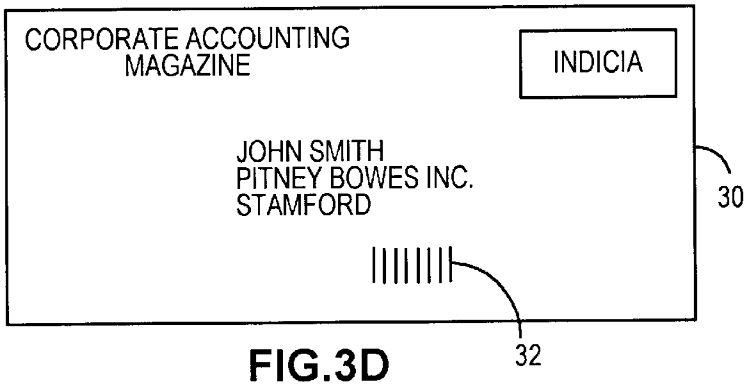

FIG. 3*d* is an example of a reject mailpiece 30 for which the operator can determine the appropriate addressee from the face of the mailpiece 30 (without opening the mailpiece 30) but for which the OCR system could not determine the appropriate addressee ("research mail"). In the example of FIG. 3*d*, the addressee database 22 contains two addressees named John Smith. The operator may be able to determine the appropriate addressee by reading the return address information. For example John Smith in accounting might get a mailpiece with a return address of a corporate accounting magazine, whereas John Smith of legal might get a mailpiece with a return address of a corporate counsel society. Thus, the mailpiece of FIG. 3*d* would be routed to John Smith of accounting and such information could be input by the operator using a voice recognition system or other reject processing system.

Return to Sender (RTS) Mailpieces

Some reject mailpieces can be "return to sender" (RTS) mailpieces. Mail may be returned to the sender for a number of reasons, such as, 1) the addressee or intended recipient printed on the mailpiece 30 may not be accurate or complete enough for the post office (i.e. United States Postal Service (USPS)) to determine the intended destination; 2) the addressee or intended recipient may have moved and left no forwarding address; or 3) the addressee or intended recipient may have moved, left a forwarding address, but the time limit for the post office to forward their mailpieces may have expired.

The post office may mark the "return to sender" mailpiece as follows: 1) an image of a hand with a pointing finger and "Returned to Sender" inscribed within the hand; 2) text may show the post office returning the piece and the reason why it was returned; 3) the post office may put on a label with "Return to Sender" text and additional text indicating why the piece was not deliverable; and/or 4) the post office may draw a line through the recipient address and/or its POSTNET bar code. These RTS markings or labels may obscure part or all of the original addressee or intended recipient.

Figure 4A:
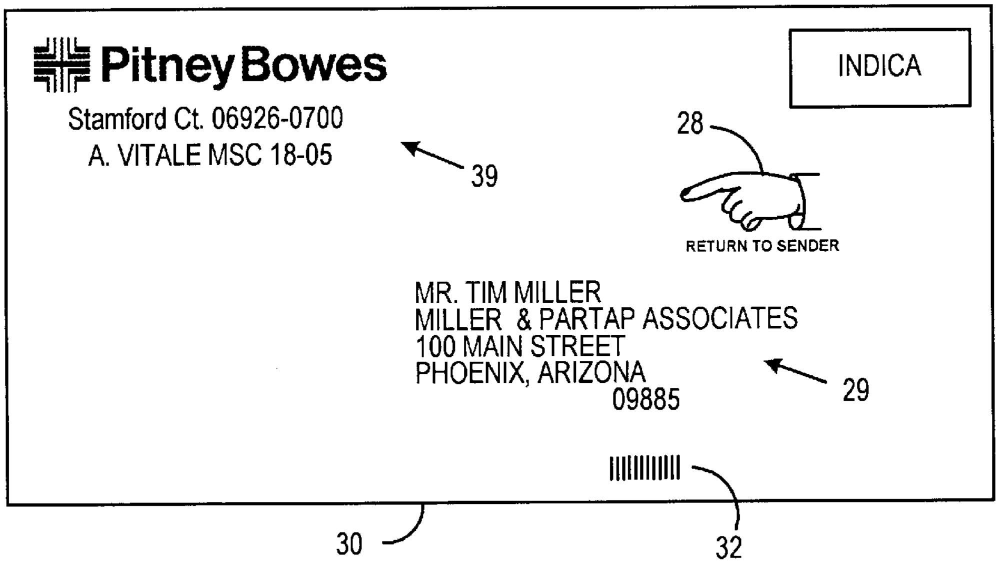
FIGS. 4*a*–*b* illustrates an exemplary "return to sender" mailpiece.

FIG. 4*a* illustrates an exemplary "return to sender" (RTS) mailpiece 30. The mailpiece 30 includes an image 28 of a hand with a pointing finger and "Return to Sender" inscribed within the hand. The exemplary mailpiece of FIG. 4 shows the addressee or intended recipient 29 "Mr. Tim Miller, Miller & Partap Associates, 100 Main Street, Phoenix, Ariz. 09885". In this example, the addressee or intended recipient has not been obscured by the USPS markings on the envelope. The return address or sender for the exemplary mailpiece is "Pitney Bowes, A. Vitale, MSC 18-05, Stamford, Conn. 06926-0700".

Figure 4B:
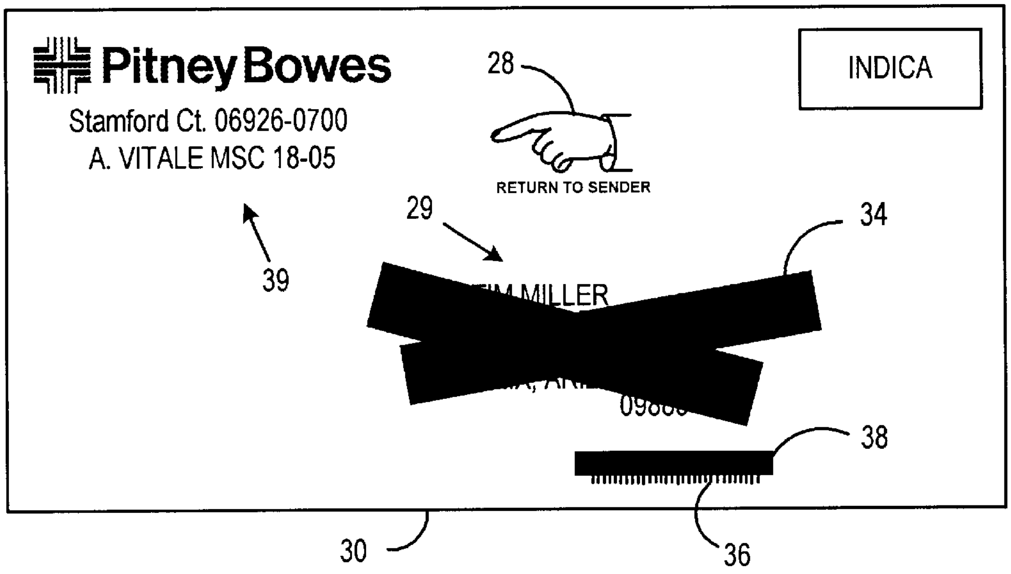

FIG. 4*b* illustrates an exemplary "return to sender" (RTS) mailpiece 30 where the addressee information has been obscured. The mailpiece 30 includes an image 28 of a hand with a pointing finger and "Return to Sender" inscribed within the hand. The exemplary mailpiece of FIG. 4*b* shows the addressee or intended recipient 29 "Mr. Tim Miller". In this example the addressee 29 (including ZIP Code and state have has been obscured by the USPS markings 34 on the envelope. The POSTNET barcode 36 has also been obscured by markings 38. The return address or sender 39 for the exemplary mailpiece is "Pitney Bowes, A. Vitale, MSC 18-05, Stamford, Conn. 06926-0700". The method of the present invention will not sort "return to sender" mailpieces such as the envelope of FIG. 4*b* to the "return to sender" bin 18". Mailpieces where the address line is obscured by return to sender graphics, labels, or strikeouts 34, 38 such as those applied by the USPS are sorted to the OCR reject bin 18'.

Return to Sender Mailpiece Processing

The present invention is related to the use of computer system 100 connected to the mailpiece sorting apparatus 8 for performing application software methods. The method of the present invention is used to process mailpieces 30 which are unreadable by the OCR system ("reject" mailpieces) and "return to sender" mailpieces which have been returned to the sender 39 identified in the return address segment of the mailpiece 30.

Figure 5:
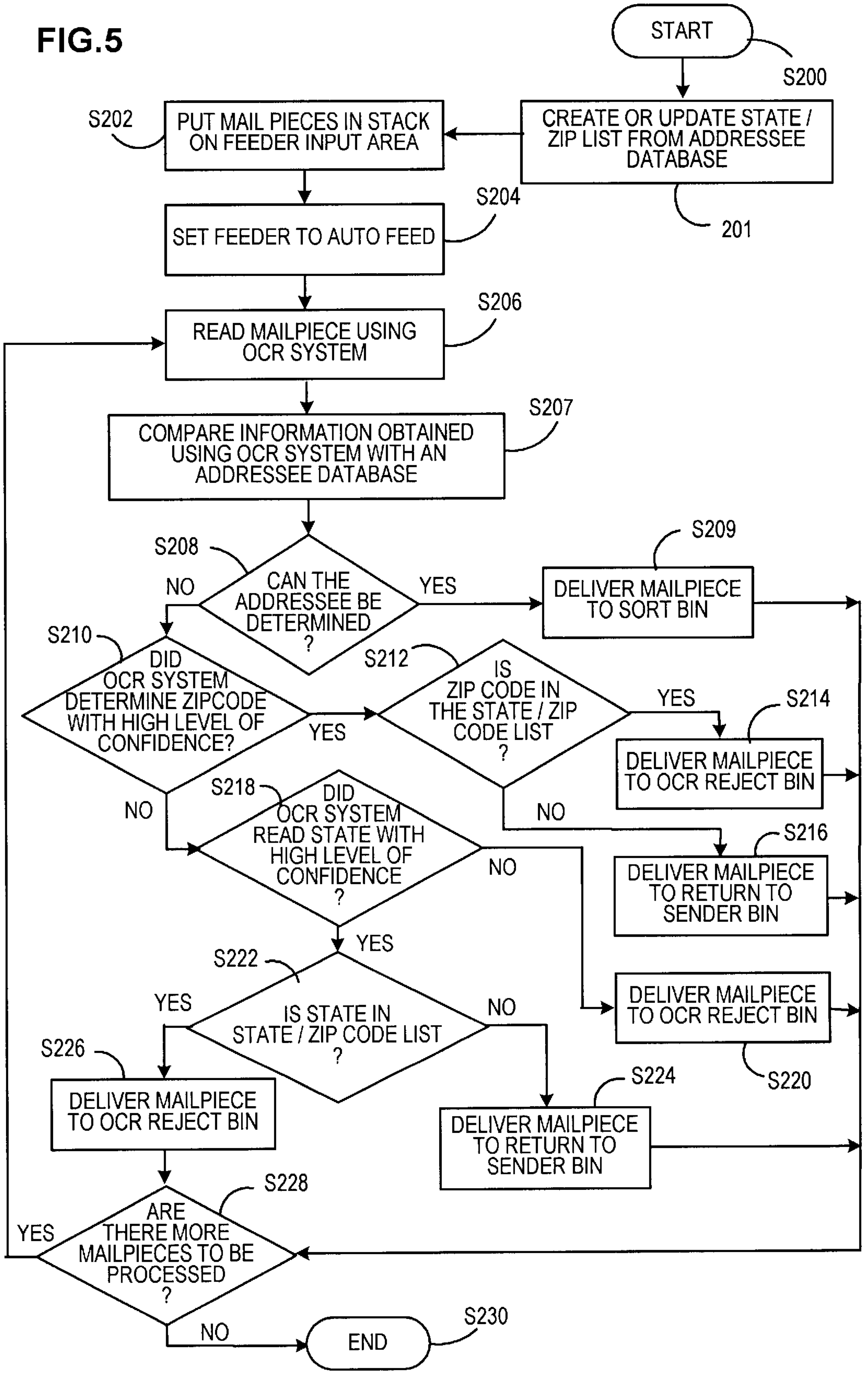
FIG. 5 is a flowchart of an embodiment of the method of in the present invention in a single sort pass scenario.

FIG. 5 is a flowchart of an embodiment of the method of in the present invention in a single sort pass scenario. At step S200 the method begins. At step S201 a state/ZIP Code list is created or updated from the addressee database. This step is performed so that the state/ZIP Code list derived from the current addressee database which can be updated as needed. This will ensure that a current version of the state/ZIP Code list is being used. The state/ZIP Code list can comprise any two character state abbreviation found in the state field of the addressee database and any 5 digit ZIP Code found in the ZIP field of the addressee database.

At step S202 a stack of mailpieces (not shown) is placed on the feeder 10 of the mailpiece sorting apparatus 8. At step S204 the feeder 10 is set to auto feed and the mailpieces 30 are moved along the feedpath the mailpiece sorting apparatus 8. At step S206 the mailpieces 30 are read using the OCR system. At step S207 information obtained using the OCR system is compared to information in a addressee database 22 of the mailpiece sorting apparatus 8. At step 208 a query is made as to whether the addressee can be determined from the information read by the OCR system. If the answer to the query of step S208 is yes, then the mailpiece 30 is delivered to the appropriate sort bin 18 at step S209. If the answer to the query S208 is no, then at step S210 a query is made as to whether the OCR system determined the addressee ZIP Code with a high "level of confidence".

The "level of confidence" refers to a numerical rating assigned to the read information (i.e. ZIP Code, state). The "level of confidence" is assigned by software such as the OCR software. For example, the OCR software could assign a "level of confidence" in the range of 0 to 100 with 100 being the highest "level of confidence" with respect to the interpreted information. The sorting software of the incoming mailpiece sorting apparatus can be configured, either preset by the manufacturer or set by the operator, to determine the "level of confidence" below which information must be assigned to be out sorted to the OCR reject bin. Conversely, an acceptable "level of confidence" can be set for which the assigned "level of confidence" can be greater than or equal to; hence the mailpiece would be sorted to the "return to sender" bin. The "level of confidence" can be determined by one of ordinary skill in the art and may including consideration of factors such as the percent of acceptable mis-sorts to the operator. The "level of confidence" for each field of information can be set differently for each field and for each sort pass for which the mailpiece is run through the mailpiece sorting apparatus.

Returning to the flowchart of FIG. 5, if the answer to the query S210 is yes, then a query is made at step S212 as to whether the ZIP Code is in the state/ZIP Code list. If the answer to the query of step S212 is yes, then the mailpiece is delivered to the OCR reject bin 18' at step S214. If the answer to the query of step S212 is no, then the mailpiece is delivered to a "return to sender" bin 18" at step S216. An attempt to identify the ZIP Code is made prior to an attempt to identify the state 1) since the ZIP Code covers that smallest geographic area; and 2) since the ZIP Code can be cross checked for a length of five numeric only characters. Checking the ZIP Code first allows for a smaller percentage of unreadable mailpieces to end up sorted to the "return to sender" bin 18". Put another way, the incoming mailpieces delivered to an employer or company mailroom are typically addressed to addressees with a particular ZIP Code or ZIP Code(s) from a small subset of ZIP Codes available for a state. Therefore, the likelihood of determining correctly that a mailpiece is a "return to sender" mailpiece by using the ZIP Code is greater than that of using the state which covers a larger geographic area. The attempt to identify the state is performed after the ZIP Code (at step S222 below) since the state covers a wider geographic area. The state can be cross checked for a length of two characters that are contained in the list of valid state abbreviations. It should be noted that the method of the present invention can be modified to use with addressee information obtained from mailpieces addressed using other formats, such as, for example, mailpieces with Canadian addressees where the address includes Province and postal code information. One of ordinary skill in the art can make such modifications as needed.

In an alternate embodiment, an attempt to identify either the state or ZIP Code could be disabled or not included. If either the attempt to identify the state or the ZIP Code is disabled (or not included), the decision flow chart will be similar to that of FIG. 5, this disablement is similar to an embodiment where one of either the State or the ZIP Code was read without a high "level of confidence".

Returning to the query of step S210 (whether the ZIP Code was determined with a high "level of confidence"), if the answer to the query is no, then at step S218 a query is made as to whether the OCR system determined the addressee state with a high "level of confidence". If the answer to the query of step S218 is no, then the mailpiece is delivered to the OCR reject bin 18' at step S220. If the answer to the query of step S218 is yes, then a query is made at step S222 as to whether the addressee state is in the state/ZIP Code list. If the answer to the query of step S222 is no then at step S224 the mailpiece is delivered to the "return to sender" bin 18". If the answer to the query of step S222 is yes then the mailpiece is delivered to the OCR reject bin 18' at step S226. Next at step S228 a query is made as to whether there are more mailpieces to be processed. The query of step S228 is also made after steps S209, S214, S216, S220 and S224. If the answer to the query of step S228 is yes, then steps S206 through S228 are repeated until all the mailpieces have been processed. If the answer to the query of step S228 is no, then the method ends at step S230.

It should be noted that the method of the present invention assumes that normal incoming mailpieces are addressed to states and ZIP Codes that are in the addressee database and thus, the state/ZIP Code list and that "return to sender" mailpieces are not addressed to states and ZIP Codes that are in the addressee database. There may be incoming "return to sender" mailpieces addressed to state and ZIP Codes in the state/ZIP Code list, such mailpieces with these states and ZIP Codes are outsorted to the OCR reject bin 18'.

Figure 6A:
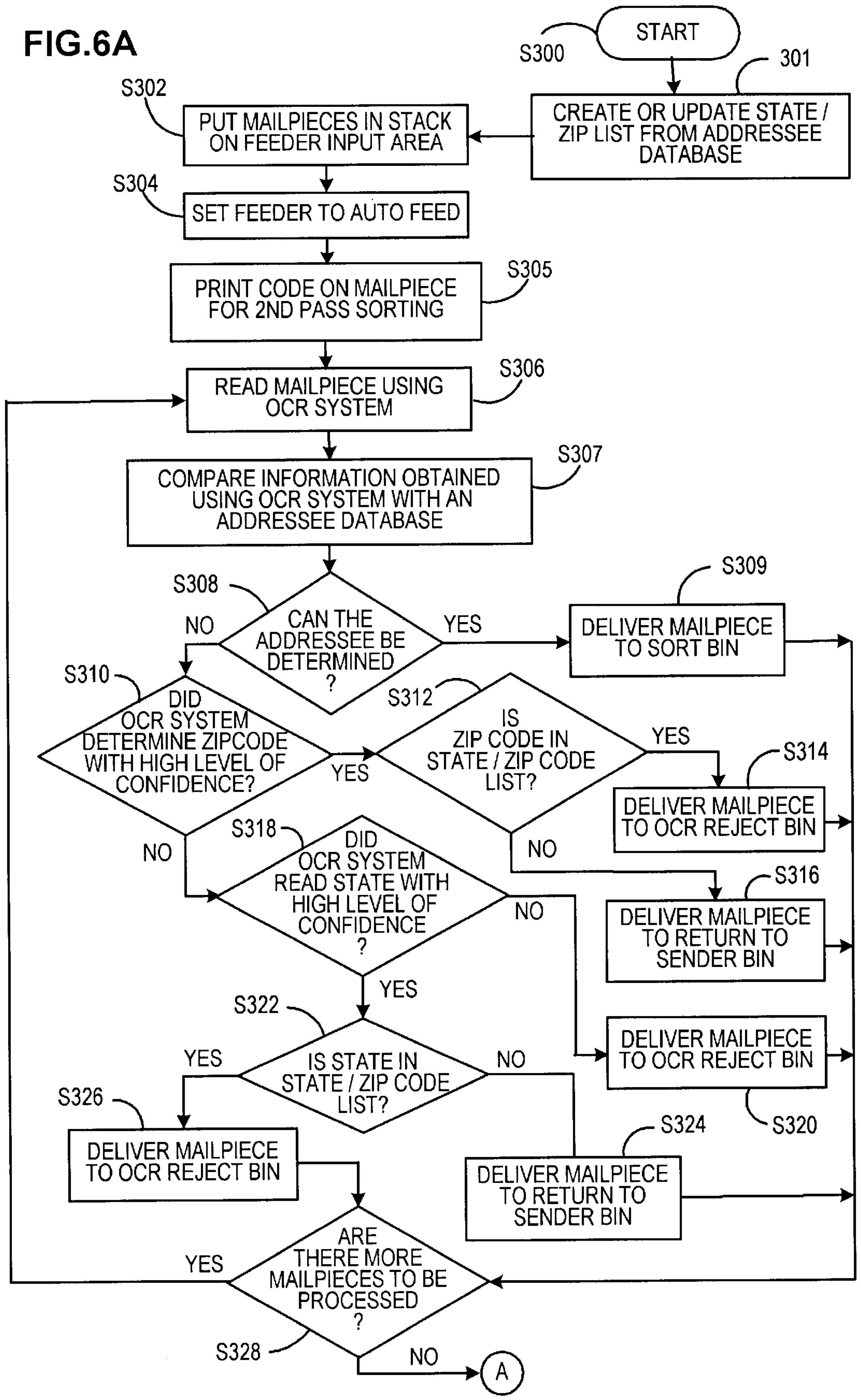
FIGS. 6*a*–*b* illustrate a flowchart of an embodiment of the method of the present invention in a multiple sort pass scenario.
Figure 6B:
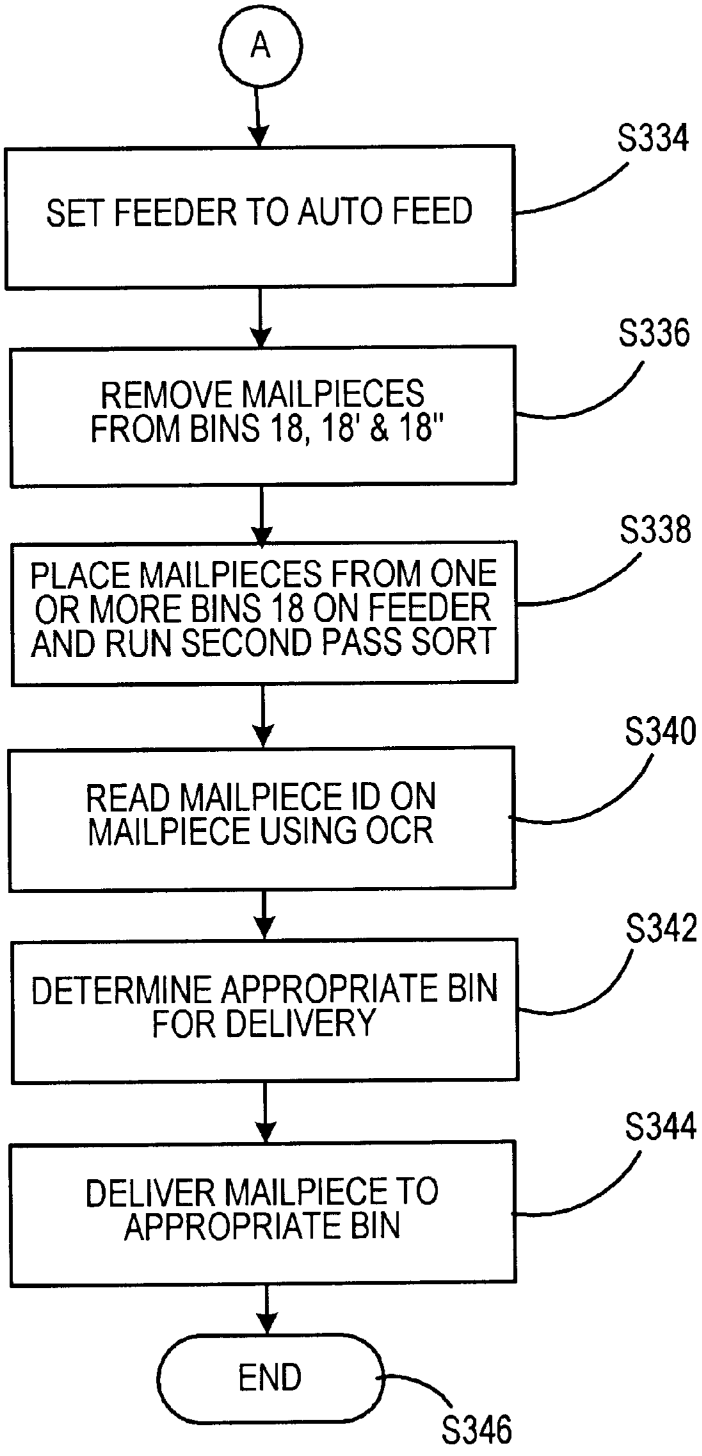

FIGS. 6*a–b* illustrate a flowchart of an embodiment of the method of the present invention in a multiple sort pass scenario. At step S300 the method begins. At step S301 a state/ZIP Code list is created or updated from the addressee database. At step S302 a stack of mailpieces (not shown) is placed on the feeder 10 of the mailpiece sorting apparatus 8. At step S304 the feeder 10 is set to auto feed and the mailpieces 30 are moved along the feedpath the mailpiece sorting apparatus 8. At step S305 a code is printed on the mailpiece 30 for second pass sorting and/or reject processing. At step S306 the mailpieces 30 are read using the OCR system. At step S307 information obtained using the OCR system is compared to information in a addressee database 22 of the mailpiece sorting apparatus 8. At step 308 a query is made as to whether the addressee can be determined from the information read by the OCR system. If the answer to the query S308 is yes, then the mailpiece 30 is delivered to the appropriate sort bin 18 at step S309. If the answer to the query of step S308 is no then at step S310 a query is made as to whether the OCR system determined the addressee ZIP Code with a high "level of confidence". If the answer to the query S310 is yes, then a query is made at step S312 as to whether the ZIP Code is in state/ZIP Code list If the answer to the query of step S312 is yes, then the mailpiece is delivered to the OCR reject bin 18' at step S314. If the answer to the query of step S312 is no, then the mailpiece is delivered to a "return to sender" bin 18" at step S316.

Returning to the query of step S310 (whether the ZIP Code was determined with a high "level of confidence"), if the answer to the query is no, then at step S318 a query is made as to whether the OCR system determined the addressee state with a high "level of confidence". If the answer to the query of step S318 is no, then the mailpiece is delivered to the OCR reject bin 18' at step S320. If the answer to the query of step S318 is yes, then a query is made at step S322 as to whether the addressee state is in the state/ZIP Code list. If the answer to the query of step S322 is no then at step S324 the mailpiece is delivered to the "return to sender" bin 18". If the answer to the query of Step S322 is yes then the mailpiece is delivered to the OCR reject bin 18' at step S326. Next at step S328 a query is made as to whether there are more mailpieces to be processed. The query of step S328 is also made after steps S309, S314, S316, S320 and S324. If the answer to the query of step S328 is yes, then steps S306 through S328 are repeated until all the mailpieces have been processed. If the answer to the query of step S328 is no, then the method ends at step S330.

At step S334 the feeder 10 is set to automatic feed. At step S336 the mailpieces 30 are removed from the bins 18, 18', 18". At step S338 the mailpieces 30 which were removed from one or more bins 18 are placed on the feeder 10 for a second pass sort. The determination as to which mailpiece 30 are run through the second pass sort is made by the operator and the equipment in coordination with a previously determined sort scheme which may be determined by one of ordinary skill in the art. At step S340 the OCR reads the mailpiece ID 32 (shown in FIG. 3*b*) on the mailpieces (the mailpiece ID 32 was printed on the mailpiece during the first pass sort at step S305). At step S342 the mailpiece sorting apparatus 8 determines the appropriate bin 18 for delivery of the mailpiece. At step S344 the mailpiece 30 is delivered to the appropriate bin 18, 18'. The operation continues until all mailpieces are sorted. At step S336, the method ends.

In alternate embodiments of the present invention, "return to sender" mailpieces can be further processed (manually or by an automated method) to notify the sender of the mailpiece that the mailpiece was not deliverable. This can be done so that the sender can update the mailing list used to obtain the addressee information. In another embodiment the incoming mailpiece sorting apparatus could track and calculate statistical information regarding the "return to sender" mailpieces. The sender could be charged for the cost of sorting "return to sender" mailpieces.

Return to sender mailpieces may be processed further using other methods such as, for example, video coding or voice recognition. Such additional processing may be determined by one of ordinary skill in the art; cost and throughput factors may be used in making the determination.

The present invention provides for better throughput and decreased sorting costs. While the present invention has been disclosed and described with reference to a various embodiments thereof, it will be apparent, as noted above that variations and modifications may be made therein. It is, thus, intended in the following claims to cover each variation and modification that falls within the true spirit and scope of the present invention.

What is claimed is:

1. A method of sorting mailpieces using a mailpiece sorting apparatus, the mailpiece sorting apparatus comprising a control system, memory devices and an addressee database, the method comprising the steps of:

a. obtaining addressee information and address information for an addressee from a mailpiece using the mailpiece sorting apparatus;

b. comparing information obtained from the mailpiece to addressee and address information from the addressee database in an attempt to determine the addressee of the mailpiece;

c. determining whether address information was determined with a level of confidence indicative of correct information if the addressee can not be determined in step b;

d. comparing the address information with information from the addressee database if the address information was determined with a level of confidence indicative of correct information;

e. delivering the mailpiece to a return to sender bin if address information compared to information from the addressee database does not match information in the addressee database;

f. storing information about the number of mailpieces sent to the return to sender bin;

g. determining a sender for each of the mailpieces sent to the return to sender bin; and h. compiling statistical information regarding the number of mailpieces attributable to each of the senders determined in step g.

2. The method as claimed in claim 1 wherein in step b the address information is a ZIP Code.

3. The method as claimed in claim 1 wherein the address information is a state.

4. The method as claimed in claim 1 wherein the address information is geographic information regarding the location of the addressee.

5. The method as claimed in claim 1 wherein the address information is ZIP Code and state information.

6. The method as claimed in claim 5 wherein in step d the Zip Code is first compared to the address information from the addressee database if the ZIP Code was determined with a level of confidence indicative of correct information and if the ZIP Code was not determined with a level of confidence indicative of correct information, then the State is compared to the address information from the addressee database.

7. The method as claimed in claim 1 further comprising the step of:

i. calculating sorting costs for return to sender mailpieces attributable to each of the senders determined in step g using statistical information compiled in step h.

8. A method of sorting mailpieces using a mailpiece sorting apparatus, the mailpiece sorting apparatus comprising a control system, memory devices and an addressee database, the method comprising the steps of:

a. obtaining addressee information including state and ZIP Code information for an addressee from a mailpiece using the mailpiece sorting apparatus;

b. creating a state/ZIP Code list from the addressee database;

c. comparing addressee information obtained from the mailpiece to addressee and address information from the addressee database in an attempt to determine the addressee of the mailpiece;

d. comparing information obtained from the mailpiece to addressee and address information from the addressee database to determine whether the addressee can be determined;

e. determining if the ZIP code information for the addressee was determined with an level of confidence indicative of correct information if the addressee was not determined in step d;

f. delivering the mailpiece to a return to sender bin if the ZIP Code is not in state/ZIP Code list created from the addressee database;

g. determining if the state information for the addressee was determined with a level of confidence indicative of correct information if the ZIP Code was not determined with a level of confidence indicative of correct information in step e;

h. determining if the state is in the state/ZIP Code list created from the addressee database if the state information for the addressee was determined with a level of confidence indicative of correct information;

i. delivering the mailpiece to a reject bin if in step i the state is in the state/ZIP Code list created from the addressee database;

j. delivering the mailpiece to a return to sender bin if the state is not in state/ZIP Code list created from the addressee database;

k. storing information about the number of mailpieces sent to the return to sender bin;

l. determining a sender for each of the mailpieces sent to the return to sender bin; and m. compiling statistical information regarding the number of mailpieces attributable to each of the senders determined in step 1.

9. The method as claimed in claim 8 further comprising the step of:

n. calculating sorting costs for return to sender mailpieces attributable to each of the senders determined in step l using statistical information compiled in step m.

* * * * *